United States Patent [19]

Viventi

[11] 3,816,282

[45] June 11, 1974

[54] RADIATION INDUCED POLYMERIZATION OF POLYSILOXANES

[75] Inventor: Richard V. Viventi, Beach Haven, N.J.

[73] Assignee: General Electric Company, Waterford, N.Y.

[22] Filed: Jan. 26, 1973

[21] Appl. No.: 327,167

Related U.S. Application Data

[63] Continuation of Ser. No. 134,510, April 15, 1971, abandoned, which is a continuation-in-part of Ser. No. 788,951, Jan. 3, 1969, abandoned.

[52] U.S. Cl... 204/159.13, 204/159.18, 260/46.5 G, 260/46.5 E, 260/46.5 UA, 260/825
[51] Int. Cl. .......................... B01j 1/10, C08f 35/02
[58] Field of Search ................. 204/159.13, 159.18; 260/46.5 G, 46.5 E, 46.5 UA, 825

[56] References Cited
UNITED STATES PATENTS

| 3,183,205 | 5/1965 | Bailey et al. ................ 260/46.5 G |
| 3,440,302 | 4/1969 | Spier et al. ........................ 260/825 |
| 3,453,248 | 7/1969 | Gowdy et al. .................... 260/79.5 |
| 3,535,145 | 10/1970 | Gowdy et al. ...................... 117/64 |
| 3,632,715 | 1/1972 | Gowdy et al. ..................... 264/136 |

Primary Examiner—Melvyn I. Marquis
Attorney, Agent, or Firm—Donald J. Voss; E. Philip Koltos; Frank L. Neuhauser

[57] ABSTRACT

A room temperature vulcanizable silicone rubber composition comprising a polydiorganosiloxane, a mercaptopolysiloxane and a free radical source which composition cures in the presence of radiation.

2 Claims, No Drawings

RADIATION INDUCED POLYMERIZATION OF POLYSILOXANES

This application is a continuation of application Ser. No. 134,510, filed Apr. 15, 1971, which in turn is a continuation-in-part of application Ser. No. 788,951, filed Jan. 3, 1969 and both now abandoned.

BACKGROUND OF THE INVENTION

Room temperature vulcanizable organopolysiloxanes are well known in the art. Such materials are described, for example, in U.S. Pat. Nos. 2,843,555 — Berridge and 3,127,363 — Nitzsche et al. These patents describe room temperature vulcanizing organopolysiloxane rubbers formed from a silanol-terminated organopolysiloxane, an organosilicate or the partial hydrolysis product of an organic silicate, and a metal salt of a carboxylic acid. The curing is accomplished through the interaction of the silanol-terminated organopolysiloxane with the organic silicate and metal salt.

An extremely valuable room temperature vulcanizing organopolysiloxane composition would be one cured by radiation. However, past attempts at such materials have been unsatisfactory because of an inability to control the rate of curing and the time necessary for effecting such a cure.

It is thus an object of this invention to provide a room temperature vulcanizing organopolysiloxane composition employing radiation as the polymerization initiator.

It is a further object of this invention to provide a method for vulcanizing organopolysiloxane compositions having free radical sources at low temperatures, employing radiation as the polymerization initiator.

These and other objects of the present invention are accomplished by means of the invention defined below.

SUMMARY OF THE INVENTION

In accordance with the present invention it has unexpectedly been discovered that certain materials will act as photosensitizers to aid in initiating radiation cure of an organopolysiloxane material at low temperatures. The organopolysiloxane composition includes a high molecular weight organopolysiloxane substituted basically with alkyl groups and 0 to 34 mole per cent of aryl groups and substituted with a small percentage of silicon-vinyl groups. There is also present in the composition an organopolysiloxane fluid having mercaptoalkyl substituents of the formula, (1) 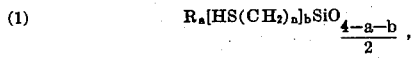

where R is selected from monovalent hydrocarbon radicals and halogenated monovalent hydrocarbon radicals of not more than 18 carbon atoms, $n$ being from 1 to 25, $a$ varies from 0.088 – 2.08, $b$ varies from 0.009 – 0.97 and the sum of $a + b$ varies from 2.019 to 2.16.

In order to allow a rapid curing of this composition at low temperatures, including room temperature, small but effective amounts of photosensitizers are added. These photosensitizers are free radical sources and can include, for example, tetraethylplumbane, nitriles, such as alpha, alpha-azobisisobutyronitrile, and peroxides.

When small amounts of these photosensitizers are added to the organopolysiloxane compositions, initial cures can be effected in as little as 5 to 10 minutes, or can be prolonged for up to 2 to 4 hours. The quantity of photosensitizers added, and the particular type, provide control over the speed of curing.

DESCRIPTION OF THE PREFERRED EMBODIMENTS

The organopolysiloxane employed according to the present invention is one which is convertible to the cured, solid, elastic state, at low temperatures and consists essentially of silicon atoms, oxygen atoms, and organic groups selected from the class consisting of alkyl, halogenated alkyl radicals and preferably methyl radicals, aromatic radicals selected from the class consisting of aryl and halogenated aryl radicals, and vinyl radicals, from 0 to 34 mol per cent of the organic groups being silicon-bonded aryl or halogenated aryl radicals, and from about 0.1 to 2 per cent of the organic groups being silicon-bonded vinyl radicals, there being from 1.98 to 2.05 organic groups per silicon atom. The viscosity range of the materials with these compositions is generally from about 100 to 100,000. These organopolysiloxanes are advantageously obtained by condensing a diorganodihydrolyzable silane, for example, dimethyldichlorosilane with or without small amounts of mono-organotrihydrolyzable silanes or triorganomonohydrolyzable silanes, for example, methyltrichlorosilane, trimethylchlorosilane, etc.; methyldihydrolyzable silanes, divinyldihydrolyzable silanes, monovinyltrihydrolyzable silanes, etc., and thereafter effecting condensation of the hydrolysis products using a condensing agent, for instance, an alkaline condensing agent, such as, potassium hydroxide, sodium hydroxide, etc., or an acidic condensing agent, such as ferric chloride, etc. Alternately, cyclic polymers of diorganosiloxanes can be condensed, along with cyclic polymers of methylvinylsiloxanes, with an alkaline condensing agent to give the desired organopolysiloxane which is convertible, at low temperatures, to the cured, solid, elastic state. Whatever the method of formation of the convertible organopolysiloxane, the final material can contain up to 34 mol per cent of aryl radicals, bonded by silicon-carbon links, and will contain from 0.1 to 2 mol per cent of vinyl radicals bonded through silicon-carbon links.

The amount of the convertible organopolysiloxane employed varies from about 50 to 85 per cent, by weight, of the total organopolysiloxane composition.

The other ingredient of the composition is the mercaptoalkyl-substituted organopolysiloxane of formula (1). Among the hydrocarbon radicals which R represents in formula (1) are alkyl radicals, such as methyl, ethyl, propyl, butyl, octyl, dodecyl, isopropyl, isobutyl, etc.; cycloalkyl radicals such as, cyclohexyl, cyclopentyl, cycloheptyl, etc.; aryl radicals such as, phenyl, biphenyl, naphthyl, benzoylphenyl, para-phenoxyphenyl, tolyl, xylyl, etc.; and aralkyl radicals such as, benzyl, phenethyl, etc. Methods for preparing these mercaptoalkyl-substituted organopolysiloxane fluids are disclosed, for example, in U.S. Pat. No. 3,346,405 — Viventi.

The photosensitizers employed in the composition are as previously mentioned, free radical sources. Among the materials which can be employed for use as photosensitizers in the composition and method of the present invention are tetraethylplumbane, nitriles, and peroxides. Other examples of such free radical sources are ditertiarybutyl peroxide, divinyl peroxide, t-butyl peracetate, ammonium persulfate, dibenzoyl peroxide and N,N-azo-bisisobutyronitrile. The free radical sources which are useful in photosensitizers in the present case include any peroxide, persulfate, diazo compound, etc. that dissociates into free radicals. A particularly effective nitrile compound is alpha, alpha-azobisisobutyronitrile.

These materials are employed in small, but effective, amounts to promote the radiation initiated curing of the previously mentioned organopolysiloxane composition. In general, the amounts of these materials employed should range from about 0.025 to 1 per cent, and are preferably in the range of from about 0.05 to 0.5 per cent. Of course, as the amount of the photosensitizer is increased, other conditions being equal, the time of tack-free cure is reduced. The radiation employed to initiate the cure can be, of course, standard sunlight. Other particular types of radiation that will cure the present composition include electromagnetic radiation as well as particulate radiation. Examples of electromagnetic radiation as well as particulate radiation that will cure the present composition include ultra-violet, infrared, X-ray and alpha, beta- or gamma-radiation.

The following examples are given as illustrative of the product and process of the present invention and should not be considered as limiting in any way its full scope as covered in the appended claims. All parts in the following examples are by weight.

EXAMPLE 1

A quantity of 29.8 parts of a polydimethylsiloxane fluid with the viscosity of approximately 2,000 centistokes where 0.2 per cent of the silicon-bonded methyl groups are replaced with silicon-bonded vinyl groups is employed as the curable organopolysiloxane. To this was added a quantity of 15 parts of a polydimethylsiloxane fluid having an average chain length of 12 siloxy groups, and having 3 gamma-mercaptopropyl groups replacing a corresponding number of silicon-bonded methyl radicals. To the organopolysiloxane fluid mixture was added a quantity of 0.03 part tetraethylplumbane, and the composition was thoroughly mixed. The composition was spread on a flat surface and exposed to sunlight. Cure initiation was noticeable in about 20 minutes and the composition was tack-free in about 1 hour and 45 minutes.

EXAMPLE 2

To an organopolysiloxane fluid mixture as in Example 1 was added a quantity of 0.12 part tetraethylplumbane. The material was again spread upon a flat surface in the presence of sunlight and gelation began in about 7 minutes. Tack-free cure was realized in less than 1 hour and 45 minutes.

EXAMPLE 3

To an organopolysiloxane composition similar to that employed in Example 1 was added 0.02 part alpha, alpha-azobisisobutyronitrile. The composition was spread upon a flat surface. There was no noticeable increase in viscosity of the composition for about 1 hour and 45 minutes after exposure to sunlight. The composition had cured completely and was nearly tack-free in about 4 hours.

EXAMPLE 4

To an organopolysiloxane fluid mixture similar to that described in Example 1 was added a quantity of 0.16 part alpha, alpha-azobisisobutyronitrile. This composition was again spread upon a flat surface and exposed to sunlight. Gelation was noticeable after 15 minutes and the composition was tack-free in less than 1 and ¾ hours.

EXAMPLE 5

As a control, an organopolysiloxane fluid mixture as prepared in Example 1 was spread upon a flat surface and exposed to sunlight, with no additive. After 4 hours the composition had not yet cured, though there was some indication of increased viscosity. Thus, the effectiveness of the photosensitizers in speeding the rate of cure employing radiation is apparent.

The curing temperatures in each of Examples 1 through 5 averaged approximately 35°C. and in no case exceeded 46°C.

EXAMPLE 6

An organopolysiloxane fluid composition similar to that prepared in Example 1 was placed in a heat source, after having been mixed with 1370 ppm, by weight, of tetraethylplumbane. The heat source was maintained at 48° to 54°C. for a period of 4 hours in the absence of radiation. At the end of this time, no evidence of curing could be detected. A similar test employing 1,470 ppm, by weight, of alpha, alpha-azobisisobutyronitrile produced the same result. Thus, it was apparent that the free radical sources added functioned as photosensitizers and that heat was not responsible for the acceleration in curing.

Thus, a new composition for producing vulcanization of organopolysiloxanes at low temperatures, including room temperature and a method for vulcanizing organopolysiloxane compositions at low temperatures has been shown.

I claim:

1. A silicone rubber composition curable at room temperature in the presence of electromagnetic and particulate radiation, selected from the class consisting of ultra-violet, infrared, X-ray, alpha, beta and gamma-radiation comprising, a. an organopolysiloxane having a viscosity of 100 to 100,000 centipoise at 25°C, consisting essentially of silicone atoms, oxygen atoms, and organic groups selected from the class consisting of alkyl radicals, halogenated alkyl radicals, aryl radicals, halogenated aryl radicals and vinyl radicals, where up to 34 mole per cent of the organic groups present may be aryl radicals and halogenated aryl radicals, and having 0.1 to 2.0 mole per cent of the organic groups as silicon-bonded vinyl radicals, there being from 1.98 to 2.05 organic groups per silicon atom;

b. an organopolysiloxane fluid having mercaptoalkyl substituents of the formula,

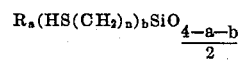

where R is selected from the class consisting of alkyl radicals and aryl radicals of up to 18 carbon atoms, $n$ is a whole number that varies from 1 to 25, $a$ varies from 0.088–2.08, $b$ varies from 0.009–0.97 and the sum of $a + b$ varies from 2.019 to 2.16; and c. from 0.025% to 1% by weight of the composition of a free radical source selected from the class consisting of tetraethylplumbane, ditertiary-butyl peroxide, divinyl peroxide, t-butyl peracetate, ammonium persulfate, dibenzoyl peroxide, and N,N-azo-bisisobutyronitrile.

2. A process for preparing a silicone rubber composition which is curable at room temperature comprising a. mixing an organopolysiloxane having a viscosity of 100 to 100,000 centipoise at 25°C consisting essentially of silicone atoms, oxygen atoms and organic groups selected from the class consisting of alkyl radical, halogenated alkyl radicals, aryl radicals, halogenated aryl radicals, and vinyl radicals, where up to 34 mole per cent of the organic radicals, and having 0.1 to 2.0 mole per cent of the organic groups of polysiloxane-bonded vinyl radicals, there being from 1.98 to 2.05 organic groups per silicone atom, with an organopolysiloxane fluid having mercaptoalkyl substituents of the formula,

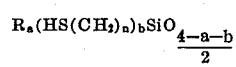

where R is selected from monovalent hydrocarbon alkyl radicals and monovalent aryl radicals where the R radical has up to 18 carbon atoms, $n$ is a whole number that varies from 1 to 25, $a$ varies from 0.088–2.08, $b$ varies from 0.009–0.97 and the sum of $a + b$ varies from 2.019 to 2.16, and with from 0.025 to 1 per cent by weight of the composition of a free radical source selected from the class consisting of tetraethylplumbane, ditertiary-butyl peroxide, divinyl peroxide, t-butyl peracetate, ammonium persulfate, dibenzoyl peroxide, and N,N-azo-bisisobutyronitrile, and b. applying radiation to the mixture selected from electromagnetic and particulate radiation, selected from the class consisting of X-ray, alpha, beta, gamma-radiation, and ultra-violet and infrared radiation.

* * * * *